（12）United States Patent
Shimizu

(10) Patent No.: US 9,122,015 B2
(45) Date of Patent: Sep. 1, 2015

(54) OPTICAL INTERCONNECT STRUCTURE

(75) Inventor: Takanori Shimizu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 215 days.

(21) Appl. No.: 13/811,804

(22) PCT Filed: Jun. 23, 2011

(86) PCT No.: PCT/JP2011/064993
§ 371 (c)(1),
(2), (4) Date: Jan. 23, 2013

(87) PCT Pub. No.: WO2012/011370
PCT Pub. Date: Jan. 26, 2012

(65) Prior Publication Data
US 2013/0121639 A1  May 16, 2013

(30) Foreign Application Priority Data
Jul. 23, 2010 (JP) ................. 2010-165919

(51) Int. Cl.
G02B 6/34 (2006.01)
G02B 6/12 (2006.01)
G02B 6/124 (2006.01)
G02B 6/122 (2006.01)
G02B 6/293 (2006.01)

(52) U.S. Cl.
CPC .............. *G02B 6/34* (2013.01); *G02B 6/12002* (2013.01); *G02B 6/124* (2013.01); *G02B 6/1228* (2013.01); *G02B 6/29334* (2013.01)

(58) Field of Classification Search
None
See application file for complete search history.

(56) References Cited

U.S. PATENT DOCUMENTS

| 6,243,517 B1* | 6/2001 | Deacon ............... 385/50 |
|---|---|---|
| 6,477,286 B1 | 11/2002 | Ouchi |
| 7,333,692 B1 | 2/2008 | Mossberg et al. |
| 8,391,656 B2* | 3/2013 | Mathai et al. ............ 385/37 |
| 2004/0170356 A1* | 9/2004 | Iazikov et al. ............ 385/37 |
| 2007/0019910 A1* | 1/2007 | Greiner et al. ............ 385/37 |
| 2010/0092128 A1 | 4/2010 | Okayama |

FOREIGN PATENT DOCUMENTS

| JP | 2001-36197 A | 2/2001 |
|---|---|---|
| JP | 2001-281492 A | 10/2001 |
| JP | 2002-14248 A | 1/2002 |
| JP | 2009-192834 A | 8/2009 |
| JP | 2010-91863 A | 4/2010 |

OTHER PUBLICATIONS

International Search Report (ISR) (PCT Form PCT/ISA/210) dated Jul. 26, 2011, in PCT/JP2011/064993.

* cited by examiner

*Primary Examiner* — Sung Pak
(74) *Attorney, Agent, or Firm* — McGinn IP Law Group, PLLC

(57) ABSTRACT

The present invention is an optical interconnect structure characterized by that it comprises an optical waveguide comprising a first core and a connective optical waveguide which is formed on the optical waveguide and comprises a second core, and that a first diffraction grating formed in the first core and a second diffraction grating formed into the second core are arranged such that at least a part of the former faces a part of the latter.

19 Claims, 4 Drawing Sheets

OPTICAL INTERCONNECT STRUCTURE

TECHNICAL FIELD

The present invention relates to an LSI with on-chip optical wirings, and in particular, to an optical interconnect structure for optical interconnection with an external light source and that between optical wiring LSI chips.

BACKGROUND ART

With the size reduction of transistors, integration density of semiconductor integrated circuits has been increased, and processing speed of electrical signals still continues increasing. Electrical signal wiring in semiconductor integrated circuits, particularly, global wiring, which is relatively long range wiring, has problems of wiring delay, degradation in signal quality (skew, jitter) and the like, and also problems of signal degradation due to crosstalk between electrical wirings adjacent to each other and of being susceptible to the noise from the surroundings of the semiconductor integrated circuit. The delay of global wiring has been suppressed by insertion of a repeater circuit. However, because of increase in integration density and in information processing amount, the suppression effect of a repeater circuit has been decreased, and additionally a bottleneck such as of increase in power consumption induced by insertion of a number of repeater circuits has been created.

In recent years, as one of methods for solving these problems, technology of partly replacing electrical wiring in a semiconductor integrated circuit by optical wiring has been proposed. As a result of such proposals, non-patent document 1 discloses a structure in which an optical wiring layer fabricated on a separate substrate is bonded onto an electrical wiring layer in a semiconductor integrated circuit.

In the optical wiring layer, arranged are an optical waveguide which guides optical signals, an optical modulator for converting electrical signals from the semiconductor integrated circuit into optical signals, a photodetector for converting optical signals having propagated and reached it into electrical signals, and the like.

The optical modulator converts electrical signals propagated electrically from an electrical wiring layer in the semiconductor integrated circuit into optical signals by using light from a light source located outside the semiconductor integrated circuit. In the similar sense, the photodetector converts optical signals having propagated to the electrical wiring layer into electrical signals.

The optical waveguides used in the optical wiring layer are arranged in high density by employing a core material having a high refractive index, such as silicon or silicon nitride, to achieve a large difference in refractive index between it and a cladding material, and thus to enable the effective bending radius to be smaller.

The dimension of a core layer in an optical waveguide is generally as small as about one micron to sub-microns. Accordingly, an optical waveguide has been optically connected with an optical fiber from a horizontal direction by employing a structure with an enlarged spot size on the optical waveguide side or using a lensed fiber having a lens effect given by processing its head. However, if horizontally plugging and unplugging an optical fiber or the like into and from a board provided with an optical wiring LSI are performed, an area for the plugging and unplugging needs to be provided, which has been a factor impeding high-density mounting.

In this respect, non-patent document 2 discloses a structure where an optical fiber is optically connected from above an optical waveguide. In the structure, the optical fiber is inclined by 10 degrees at a diffraction grating fabricated on the optical waveguide side, so as to reduce the amount of light propagating toward the opposite direction to the desired one (FIGS. 2, 14 and 15 in non-patent document 2).

CITATION LIST

Non-Patent Documents

Non-patent document 1: Kenichi Nishi and Keishi Ohashi, "LSI on chip optical interconnect technology", IEICE Technical Report, Vol. 107, No. 372, LQE2007-118, pp. 27-32, December, 2007.
Non-patent document 2: IEEE LEOS NEWSLETTER, December 2008 issue, pp. 4-14.

SUMMARY OF INVENTION

Technical Problem

Because, in the structure disclosed in non-patent document 2, the connection is performed by inclining an optical fiber, there is a problem of difficulty in alignment of the optical fiber angle and in holding the optical fiber. The structure has also a problem in that, because an optical fiber generally is 250 microns in diameter, required are a dedicated area on the optical wiring LSI for its connection with the optical fiber and a space on the optical wiring LSI for holding the optical fiber, and thus it is impossible to achieve high-density optical interconnect demanded in such on-board mounting.

The objective of the present invention is to provide an optical interconnect structure which can solve the problems described above.

Solution to Problem

The present invention is an optical interconnect structure characterized by that it comprises an optical waveguide comprising a first core, and a connective optical waveguide comprising a second core, which is formed on the optical waveguide, and that at least a part of a first diffraction grating formed in the first core and a part of a second diffraction grating formed in the second core are arranged in a manner to face each other.

Advantageous Effects of Invention

An optical interconnect structure according to the present invention enables high-density optical interconnect.

DESCRIPTION OF EMBODIMENTS

First Exemplary Embodiment

Figure 1:
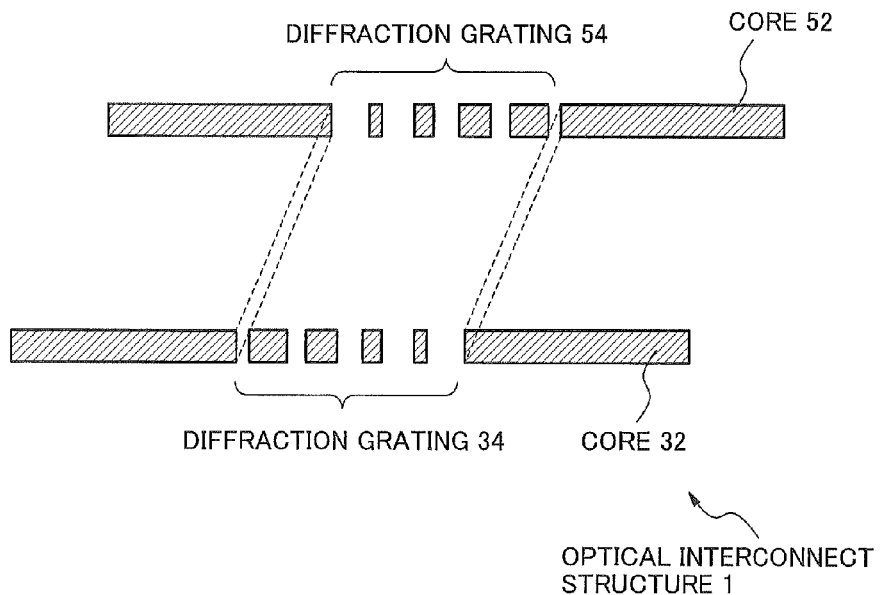
FIG. 1 is a perspective view of only core layer portions extracted from an optical interconnect structure of a first exemplary embodiment.
Figure 2:
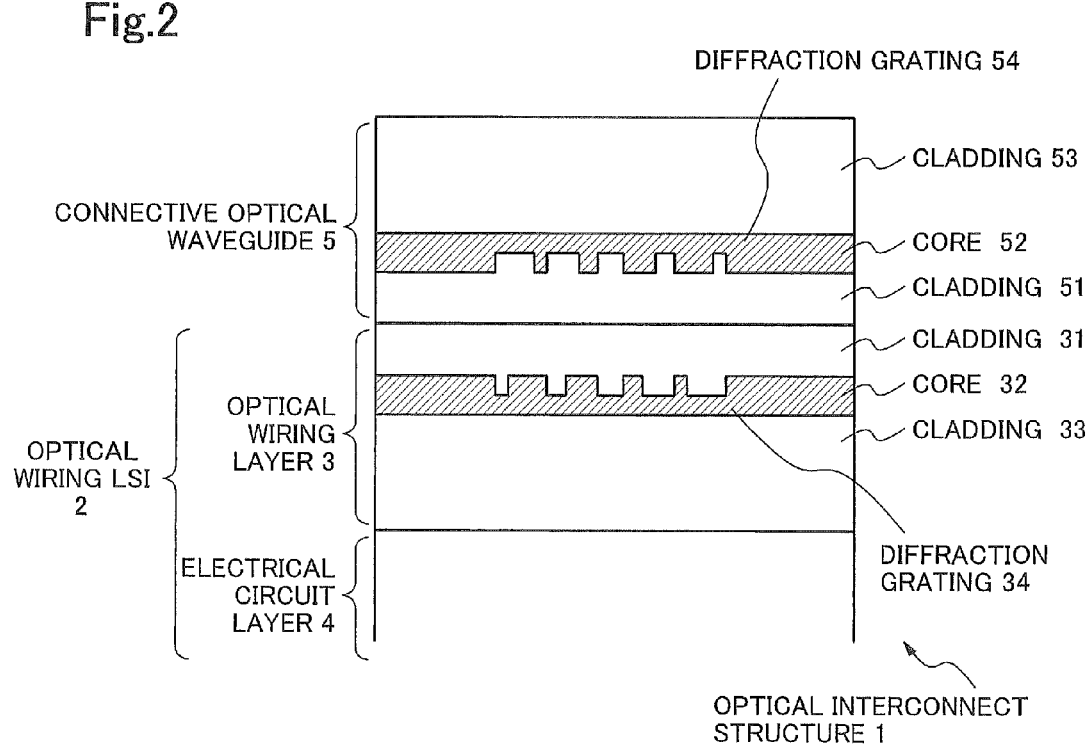
FIG. 2 is a cross-sectional view of an optical interconnect structure 1 of the first exemplary embodiment.

Next, a first exemplary embodiment will be described below. FIG. 1 shows a perspective view of only core layer portions extracted from an optical interconnect structure of the present exemplary embodiment. FIG. 2 shows a cross-sectional view of the optical interconnect structure 1.

As shown in FIG. 2, the optical interconnect structure 1 of the present exemplary embodiment comprises an optical wiring LSI 2 comprising an optical wiring layer 3, and also comprises a connective optical waveguide 5.

Figure 3:
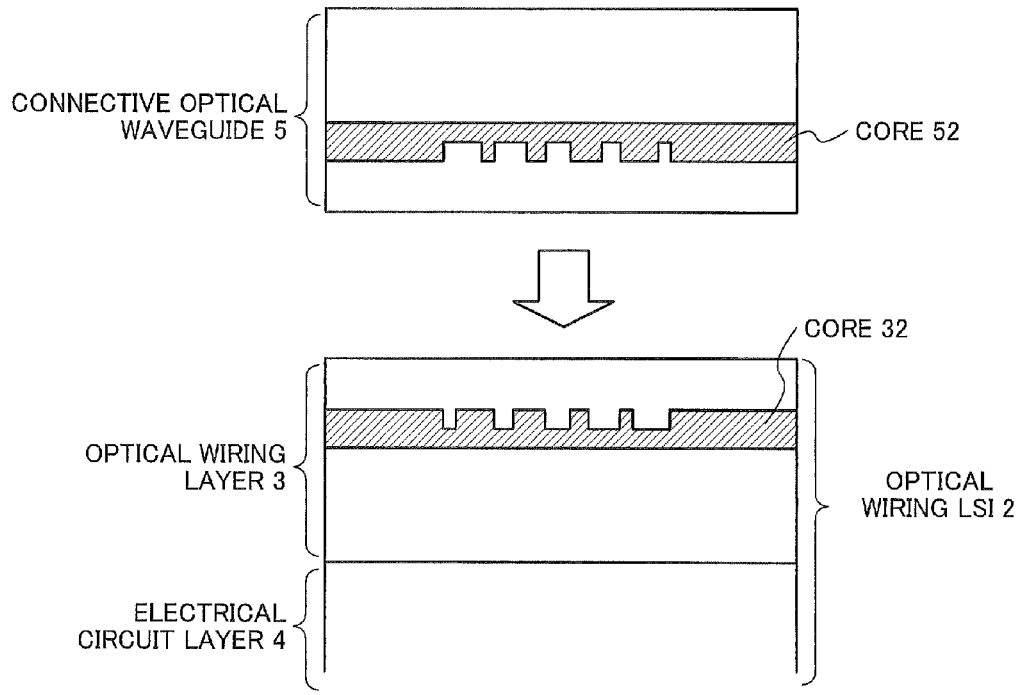
FIG. 3 is a cross-sectional view showing a positional relationship between an optical wiring LSI 2 and a connective optical waveguide 5 before their connection.
Figure 4:
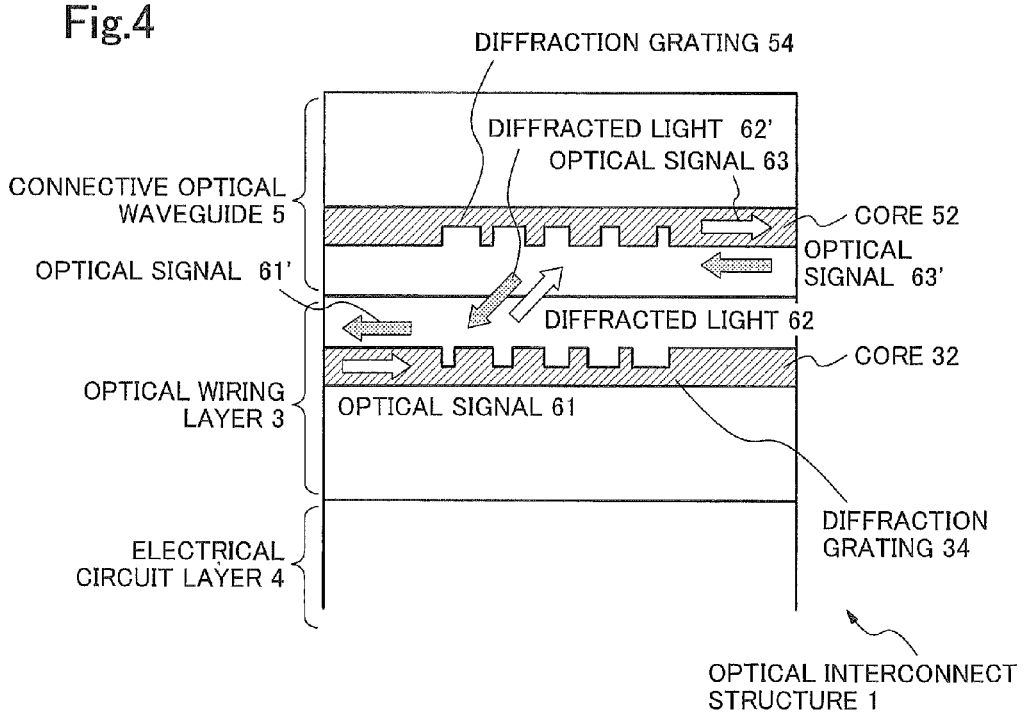
FIG. 4 is a cross-sectional view showing a positional relationship between the optical wiring LSI 2 and the connective optical waveguide 5 after their connection.

FIG. 3 is a transverse cross-sectional view showing a positional relationship between the optical wiring LSI 2 and the connective optical waveguide 5 before their connection. FIG. 4 is a transverse cross-sectional view showing a positional relationship between the optical wiring LSI 2 and the connective optical waveguide 5 after their connection.

In the optical interconnect structure 1, the detachable connective optical waveguide 5 is connected onto the optical wiring LSI 2 by a fitting unit and a fitted unit (not illustrated in the figures). By fitting the fitting unit, consisting of such as a fitting pin, into the fitted unit, positional alignment between a portion for optical connection in the optical wiring LSI 2 and that in the connective optical waveguide 5 can be accomplished.

As shown in FIG. 2, the optical wiring LSI 2 comprises the optical wiring layer 3 and an electrical circuit layer 4. The optical wiring layer 3 is formed on the electrical circuit layer 4. Although not illustrated in the figures, the optical wiring LSI 2 is equipped with optical devices such as an optical modulator for converting electrical signals to optical signals and a photodetector for converting optical signals to electrical signals.

The optical wiring layer 3 consists of at least three layers. A first layer comprises a cladding 33 (first cladding). On the first layer, formed is a second layer comprising a core 32 (first core). On the second layer, formed is a third layer comprising a cladding 31 (second cladding). That is, the optical wiring layer 3 has a structure where, on the electrical circuit layer 4, the cladding 33, the core 32 and the cladding 31 are sequentially formed in the order from the bottom.

The refractive indexes of the cladding 31 and the cladding 33 are not limited to particular values, and may be any values smaller than that of the core 32. A diffraction grating 34 (first diffraction grating) is formed in the core 32.

Although not illustrated in the figures, the optical modulator and the photodetector are electrically connected to the electrical circuit layer 4. Electrical signals inputted to the optical modulator are transmitted from the electrical circuit layer 4, and electrical signals outputted from the photodetector are transmitted to the electrical circuit layer 4.

The connective optical waveguide 5 is arranged on the optical wiring layer 3 in the optical wiring LSI 2. The connective optical waveguide 5 consists of, similarly to the optical wiring layer 3, at least three layers. A first layer comprises a cladding 51 (third cladding). On the first layer, formed is a second layer comprising a core 52 (second core). On the second layer, formed is a third layer comprising a cladding 53 (fourth cladding). That is, the connective optical waveguide 5 has a structure where, on the cladding 31 of the optical wiring layer 3, the cladding 51, the core 52 and the cladding 53 are sequentially formed in the order from the bottom.

The refractive indexes of the cladding 51 and the cladding 53 are not limited to particular values, and may be any values smaller than that of the core 52. As shown in FIG. 2, a diffraction grating 54 (second diffraction grating) is formed at a position, in the core 52, facing the diffraction grating 34.

As shown in FIGS. 2 to 4, when it is allowed to neglect the influence of reflection of a fraction of light not diffracted by the gratings 34 or 54, grooves constituting the diffraction gratings 34 and 54 need not pass through the respective core layers. In other words, in the above-described case, the core 32 of the optical wiring layer 2 only needs to have the grooves of the diffraction grating 34 penetrating at least a part of its thickness in its surface facing the diffraction grating 54 of the connective optical waveguide 5, and a corresponding area in its surface on the opposite side from the connective optical waveguide 5 may thus be kept ungrooved. Similarly, the core 52 of the connective optical waveguide 5 only needs to have the grooves of the diffraction grating 54 penetrating at least a part of its thickness in its surface facing the optical wiring layer 3, and a corresponding area in its surface on the opposite side from the optical wiring layer 3 may thus be kept ungrooved.

As shown in FIG. 4, the diffraction grating 34 has a function to produce diffracted light 62 by converting the optical axis of an optical signal 61 having reached it after propagating through the core 32 of the optical wiring layer 3, and the diffraction grating 54 has a function to convert the optical axis of the diffracted light 62 and thus to couple it to the core 52 of the connective optical waveguide 5. Similarly, the diffraction grating 54 has a function to produce diffracted light 62' by converting the optical axis of an optical signal 63' having reached it after propagating through the core 52, and the diffraction grating 34 has a function to convert the optical axis of the diffracted light 62' and thus to couple it to the core 32.

Structures of the diffraction gratings 34 and 54 can be determined by the use of the FDTD (Finite Difference Time Domain) method or the like. In the diffraction gratings 34 and 54, their grating periods, groove depths and filling factors determine how they perform the optical-axis conversions, which tilt the optical axis of the diffracted light 62. In the case of the diffraction grating 34, the diffraction efficiency in the optical-axis conversion of the optical signal 61 having propagated through the core 32 can be increased by adjusting the period, groove depth and filling factor of the grating 34.

Moreover, in the present exemplary embodiment, as a method of tilting the optical axis of the optical signal 61, an example of the structures of the diffraction gratings 34 and 54 in which intervals of the diffraction gratings are adjusted are shown like below. However, the structures are not limited to these, if the optical axis of the optical signals 61 can be tilted.

In the present exemplary embodiment, as shown in FIG. 4, the diffraction grating 34 is formed such that its grating interval increases progressively in the propagation direction of the optical signal 61. That is, the grating interval of the diffraction grating 34 increases monotonously in terms of the propagation direction of the optical signal 61. With this configuration, the optical signal 61 having propagated through the core 32 is diffracted by the diffraction grating 34 to become the diffracted light 62, and the optical axis of the diffracted light 62 is converted to upward from the propagation direction of the optical signal 61.

Similarly, the diffraction grating 54 is formed such that its grating interval increases progressively in the propagation direction of the optical signal 63'. That is, the grating interval of the diffraction grating 54 increases monotonously in terms of the propagation direction of the optical signal 63'. With this configuration, the optical signal 63' having propagated through the core 52 is diffracted by the diffraction grating 54 to become the diffracted light 62', and the optical axis of the diffracted light 62' is converted to downward from the propagation direction of the optical signal 61.

In the present exemplary embodiment, the configuration is set to be such that the diffracted light 62 is inclined by 10 degrees from the vertical direction, but it is not limited to this.

When bi-directional propagation of optical signals, from the optical wiring layer 3 to the connective optical waveguide 5 and vice versa, is required, it is necessary to increase both the grating interval of the diffraction grating 34 and that of the diffraction grating 54 progressively in the respective propagation directions of the corresponding optical signals.

[Description of operation and effect] Next, operation and effect of the optical interconnect structure 1 will be described using FIGS. 3 and 4.

The optical wiring LSI 2 and the connective optical waveguide 5 are detachably connected with each other at their surfaces facing each other (in the figures, the top surface of the optical wiring LSI 2 and the bottom surface of the connective optical waveguide 5), by moving them closer to each other from approximately the vertical direction, in a manner to locate the diffraction grating 34 of the optical wiring layer 3 and the diffraction grating 54 of the connective optical waveguide 5 at respective positions facing each other.

As shown in FIG. 4, the optical signal 61 having propagated through the core 32 of the optical wiring layer 3 is diffracted by the diffraction grating 34 to become the diffracted light 62, and is coupled to the diffraction grating 54. Coupled to the diffraction grating 54, the diffracted light 62 becomes the optical signal 63 which propagates through the core 52 of the connective optical waveguide 5. Similarly, the optical signal 63' from the connective optical waveguide 5 is diffracted to become the diffracted light 62', which, if then coupled to the diffraction grating 34, propagates through the optical wiring layer 3 as the optical signal 61'.

With this configuration, the optical interconnect structure 1 of the present exemplary embodiment can transmit the optical signal 61 propagating in the optical wiring LSI 2 to the connective optical waveguide 5, which is an external wiring, and it thus enables higher density optical interconnect compared to cases of using an optical fiber.

In the present exemplary embodiment, as a method of tilting the optical axis of the optical signal 61, the grating interval of the diffraction grating 34 or that of the diffraction grating 54 increases progressively. The effect of this configuration will be described below.

In the case of 90 degree optical-axis conversion, the optical axis of the optical signal 61 having propagated through the core 32 is changed perpendicularly when diffracted by the diffraction grating 34. Accordingly, the diffracted light 62 resulting from the optical-axis conversion propagates in a direction perpendicular to the optical wiring layer 3, and then is coupled to the diffraction grating 54. In this case, because the diffracted light 62 is coupled perpendicularly to the diffraction grating 54, the optical signal 63 resulting from the coupling propagates in both the left and right directions, that is, in both the desired and the opposite directions, and consequently the coupling efficiency is undesirably halved.

Therefore, in the present exemplary embodiment, the diffracted light 62 is inclined from the perpendicular direction. For that purpose, the structure is adapted to the adjusted period, groove depth and filling factor with respect to the diffraction grating 34.

As a result, after the coupling of the diffracted light 62 to the diffraction grating 54, it becomes possible to prevent the optical signal 63 from propagating in the direction opposite to that of desired propagation (rightward direction in FIG. 4), and thus to increase the coupling efficiency between the diffracted light 62 and the diffraction grating 54. Although the above description has been given of the case of transmitting the optical signal 61 having propagated the core 32 to the core 52, it is similarly applicable to the case of transmitting the optical signal 63' having propagated the core 52 to the core 32. That is, bi-directional transmission of optical signals becomes possible.

Second Exemplary Embodiment

Figure 5:
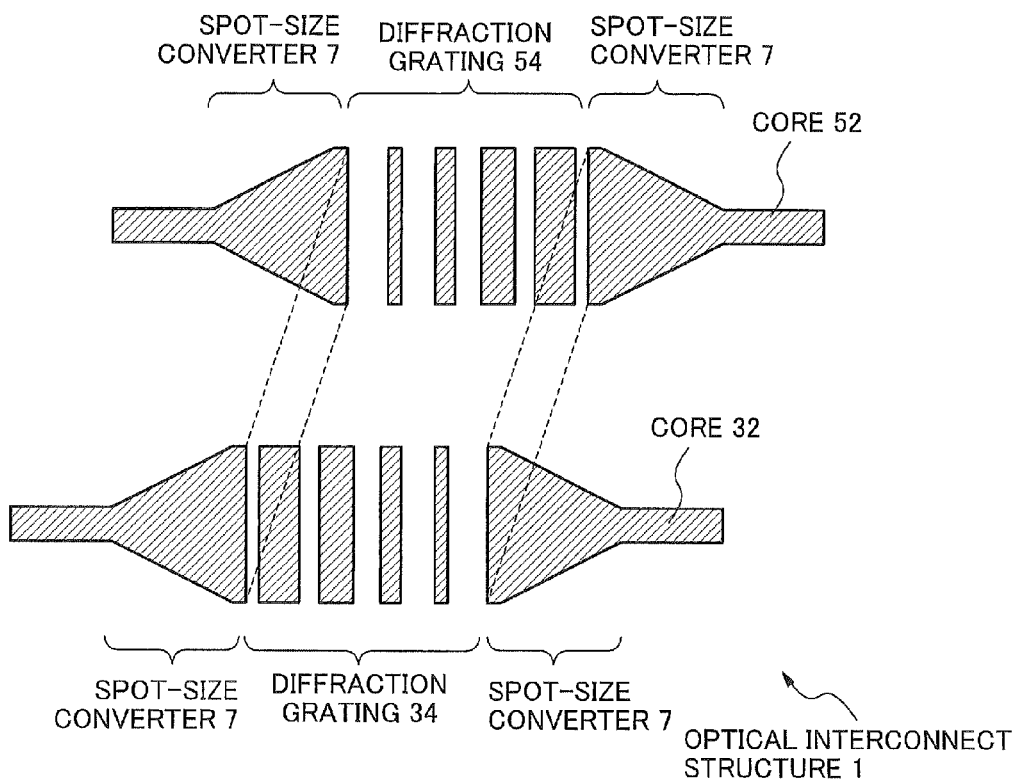
FIG. 5 is a perspective view of only core layer portions extracted from an optical interconnect structure of a second exemplary embodiment.

Next, a second exemplary embodiment will be described with reference to a drawing. FIG. 5 is a diagram showing the second exemplary embodiment, where a perspective view of only core layer portions extracted respectively from an optical wiring layer 3 and a connective optical waveguide 5 is illustrated.

[Description of structure] In the present exemplary embodiment, similarly to in the first exemplary embodiment, an optical interconnect structure 1 comprises an optical wiring LSI 2 comprising an optical wiring layers 3, and also comprises a connective optical waveguide 5. The optical wiring layer 3 comprises a core 32 in which a diffraction grating 34 is formed, and the connective optical waveguide 5 comprises a core 52 in which a diffraction grating 54 is formed. Then, the diffraction gratings 34 and 54 are arranged such that at least a part of one of them faces a part of the other.

A difference of the present exemplary embodiment from the first exemplary embodiment is that the core 32 is provided with spot-size converters 7 before and after the diffraction grating 34. Similarly, the core 52 is provided with spot-size converters 7 before and after the diffraction grating 54.

The arranging the spot-size converters 7 before and after the diffraction grating 34 makes it possible to enlarge the width of the diffraction grating 34 to be larger than that of the core 32. Similarly, the arranging the spot-size converters 7 before and after the diffraction grating 54 makes it possible to enlarge the width of the diffraction grating 54 to be larger than that of the core 52.

Further, in the present exemplary embodiment, the core 32 in the optical wiring layer 3 has a refractive index, $Ncr3$, equivalent to that of the core 52 in the connective optical waveguide 5, $Ncr5$, and claddings 31 and 33 in the optical wiring layer 3 have a refractive index, $Ncl3$, equivalent to that of claddings 51 and 53 in the connective optical waveguide 5, $Ncl5$.

[Description of operation and effect] Next, operation and effect of the present exemplary embodiment will be described below. With respect to the diffraction gratings 34 and 54 in the present exemplary embodiment, because an overlap between a diffracted light 62 and the diffraction grating 34 or 54 is enlarged with the use of the above-described configuration, even if a positional deviation occurred between the optical wiring LSI 2 and the connective optical waveguide 5 in a direction parallel to their connection surfaces, degradation in the optical transmission characteristics can be prevented. The other structures and operations in the present exemplary embodiment are the same as that in the first exemplary embodiment.

Third Exemplary Embodiment

Next, a third exemplary embodiment will be described below.

[Description of structure] In the present exemplary embodiment, similarly to in the second exemplary embodiment, an optical interconnect structure 1 comprises an optical wiring LSI 2 comprising an optical wiring layers 3, and also comprises a connective optical waveguide 5. The optical wiring layer 3 comprises a core 32 in which a diffraction grating 34 is formed, and the connective optical waveguide 5 comprises a core 52 in which a diffraction grating 54 is formed. Then, the diffraction gratings 34 and 54 are arranged such that at least a part of one of them faces a part of the other.

Further, in the present exemplary embodiment, the core 32 in the optical wiring layer 3 has a refractive index, Ncr3, equivalent to that of the core 52 in the connective optical waveguide 5, Ncr5, and claddings 31 and 33 in the optical wiring layer 3 have a refractive index, Ncl3, equivalent to that of claddings 51 and 53 in the connective optical waveguide 5, Ncl5.

In the present exemplary embodiment, structures of the diffraction grating 54 in the connective optical waveguide 5 are such that the grating interval increases at the same increasing rate as, but in the opposite direction to the diffraction grating 34. In other words, when viewed in an identical direction, in contrast to that the configuration of the diffraction grating 34 is such that its grating interval increases progressively, the configuration of the diffraction grating 54 is such that its grating interval decreases progressively at a rate equivalent to the increasing rate of the grating interval of the diffraction grating 34.

[Description of operation and effect] Next, operation and effect of the present exemplary embodiment will be described. In the present exemplary embodiment, the grating interval of the diffraction grating 54 increases at the same increasing rate as, but in the opposite direction to, the grating interval of the diffraction grating 34. As a result, a beam shape of the diffracted light 62 from the diffraction grating 34 and that of the diffracted light 62' from the diffraction grating 54 can be made identical.

Specifically, if the diffraction gratings 34 and 54 have a constant interval, when an optical signal propagates through the diffraction gratings, the amount of diffracted light is large in the first half portion of each of the diffraction gratings (in the case of an optical signal 61 in FIG. 4, in the left-hand portion of the diffraction grating 34), and it gradually decreases in the latter half portion, and accordingly a beam shape of the diffracted light becomes asymmetric. As a result, there occurs difference between a beam shape of the diffracted light 62 and that of the diffracted light 62' (deviation in intensity peak position), which gives rise to decrease in the coupling efficiency. In this respect, in the present exemplary embodiment, by achieving coincidence between the beam shapes through the adjustment of the intervals of the diffraction gratings 34 and 54, the connection efficiency (coupling efficiency) between the diffraction grating 34 of the optical wiring layer 3 and the diffraction grating 54 of the connective optical waveguide 5 can be increased.

Fourth Exemplary Embodiment

Figure 6:
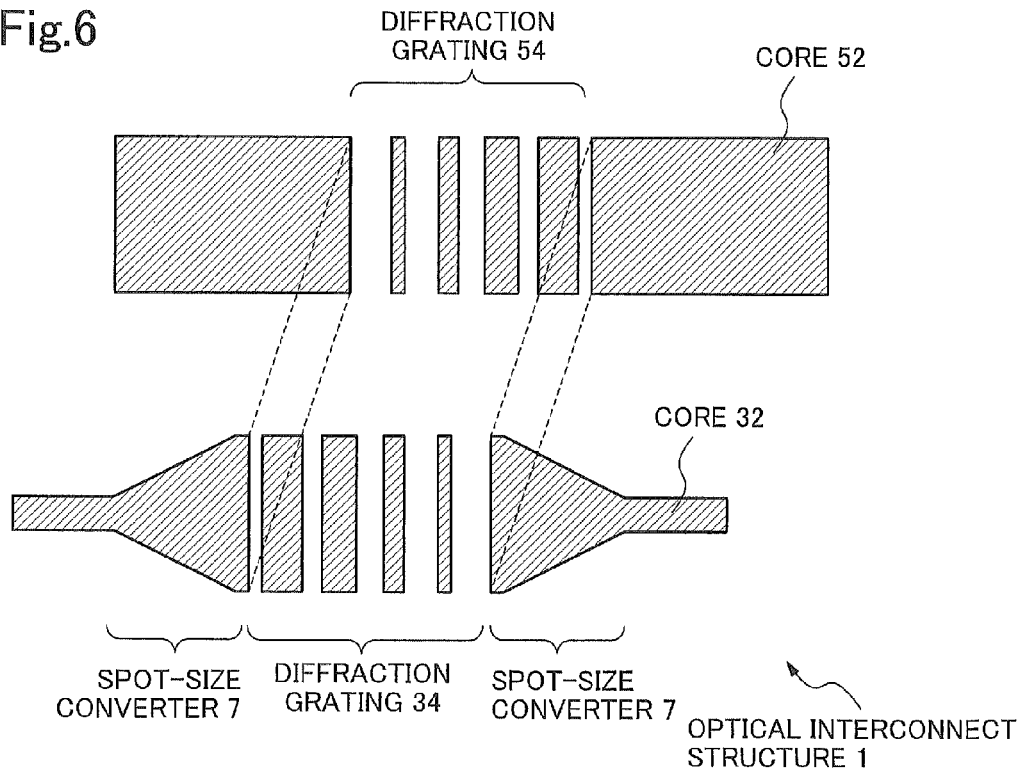
FIG. 6 is a perspective view of only core layer portions extracted from an optical interconnect structure of a fourth exemplary embodiment.

Next, a fourth exemplary embodiment of the present invention will be described with reference to a drawing. FIG. 6 is a diagram showing the fourth exemplary embodiment, where a perspective view of only waveguide core portions extracted respectively from an optical wiring layer 3 and a connective optical waveguide 5 is illustrated.

[Description of structure] In the present exemplary embodiment, similarly to in the first to third exemplary embodiments, an optical interconnect structure 1 comprises an optical wiring LSI 2 comprising an optical wiring layers 3, and also comprises a connective optical waveguide 5. The optical wiring layer 3 comprises a core 32 in which a diffraction grating 34 is formed, and the connective optical waveguide 5 comprises a core 52 in which a diffraction grating 54 is formed. Then, the diffraction gratings 34 and 54 are arranged such that at least a part of one of them faces a part of the other.

A difference of the present exemplary embodiment from the first to third exemplary embodiments is that a relative refractive index difference, $\Delta cw$ $(=(Ncr3^2-Ncl3^2)/2Ncr3^2)$, between the core 32 and claddings 31 and 33 in the optical wiring layer 3 is larger than a relative refractive index difference, $\Delta cw$ $(=(Ncr5^2-Ncl5^2)/2Ncr5^2))$, between the core 52 and claddings 51 and 53 in the connective optical waveguide 5. Further, in accordance with the difference between the relative refractive index differences, spot-size converters 7 are provided before and after the diffraction grating 34 in the core 32 of the optical wiring layer 3. The spot-size converters 7 are provided for the purpose of enlarging the spot size of signal light 61 in a manner to make the spot size of diffracted light 62 coincide with that of signal light 63 propagating through the connective optical waveguide 5.

The connective optical waveguide 5 is, for example, a flexible waveguide or a rigid waveguide, which is used as an optical waveguide outside an LSI. It is made up of a silica waveguide, or a polymer waveguide, with a relative refractive index difference $\Delta cw$ of 0.5 to a few percent against the core 52 and the claddings 51 and 53.

The above-described spot-size converters 7 may be arranged intentionally in a manner to make the spot size of the signal light 61 (and also of the diffracted light 62) larger than that of the signal light 63, and in accordance with it, different spot-size converters 7 may be provided before and after the diffraction grating 54 in the core 52.

[Description of operation and effect] Next, operation and effect of the present exemplary embodiment will be described below. In the present exemplary embodiment, since the relative refractive index difference between the core 52 and the claddings 51 and 53 in the connective optical waveguide 5 is set at a smaller value than that between the core 32 and the claddings 31 and 33 in the optical wiring layer 3, by installing the spot-size converters 7 before and after the diffraction grating 34 in the core 32 of the optical wiring layer 3 having a smaller spot size, the spot size in the optical wiring layer 3 is enlarged, and thereby efficient coupling to the connective optical waveguide 5 having a larger spot size is achieved.

The optical wiring layer 3 usually has a larger relative refractive index difference than that of an optical waveguide outside an LSI, such as a flexible waveguide or a rigid waveguide, so as to make it possible to arrange optical wirings on the LSI. The present exemplary embodiment can be adopted in such a situation.

In the case of using a flexible waveguide, processing accuracy can be increased by forming the part of the diffraction grating 54 in the connective optical waveguide 5 in a silica block with the same refractive index as that of the core 52 and embedding it in the flexible waveguide.

In the case of using a rigid waveguide, it is also possible to use a structure where the optical wiring LSI 2 is installed in the configuration of a waveguide fabricated on a substrate or the like (for example, an optical wiring board). A material for the claddings 51 and 53 in the connective optical waveguide 5 is desired to have the same refractive index as that of claddings 31 and 33 in the optical wiring layer 3. In order to prevent reflection in the optical interconnect structure 1, it is also possible to provide an antireflection coating at the connection surface between the optical wiring LSI 2 and the connective optical waveguide 5.

Fifth Exemplary Embodiment

Figure 7:
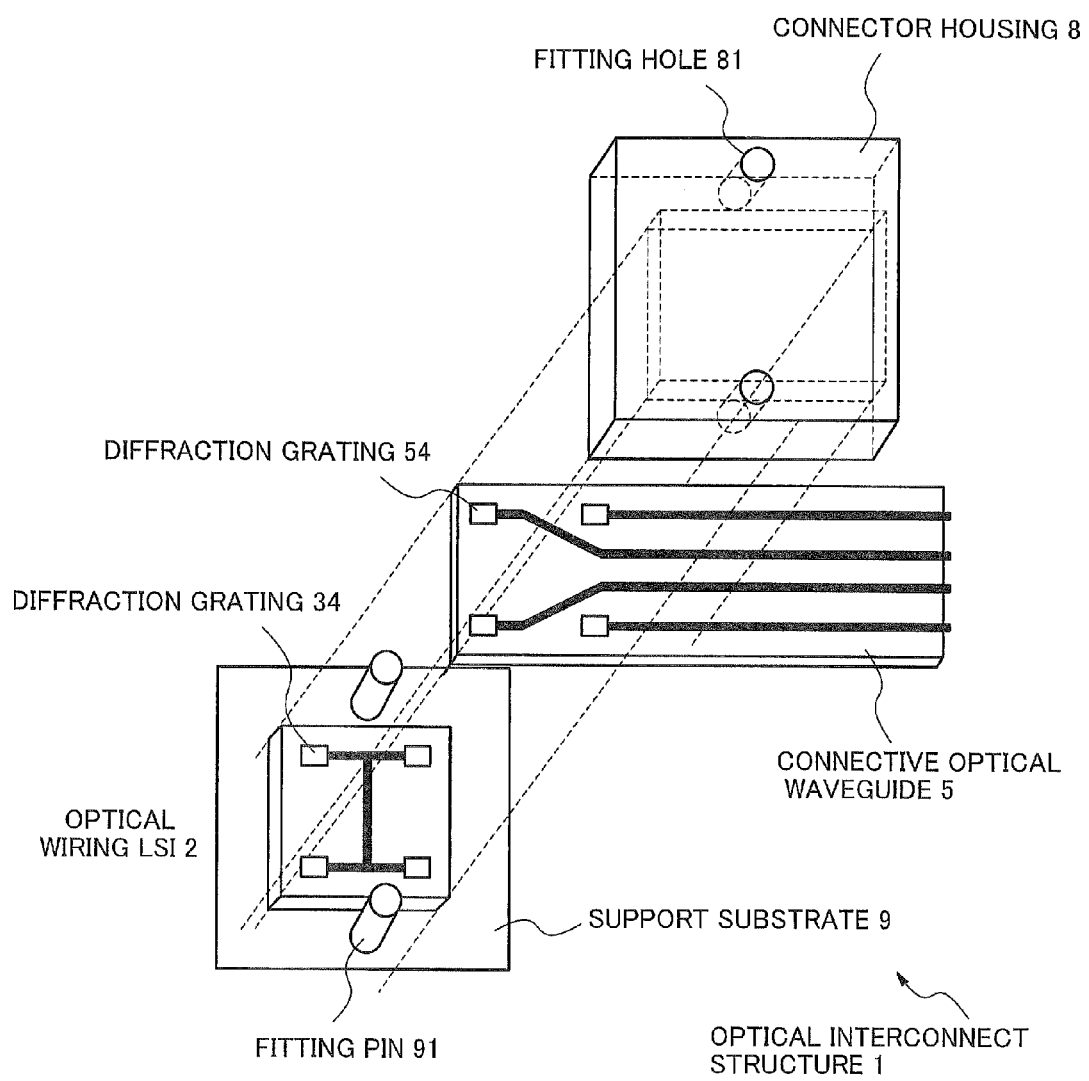
FIG. 7 is a perspective view showing a fifth exemplary embodiment.

Next, a fifth exemplary embodiment will be described with reference to a drawing. FIG. 7 is a perspective view showing a fifth exemplary embodiment.

[Description of structure] In the present exemplary embodiment, similarly to in the first to fourth exemplary embodiments, an optical interconnect structure 1 comprises an optical wiring LSI 2 comprising an optical wiring layers 3, and also comprises a connective optical waveguide 5. The optical wiring layer 3 comprises a core 32 in which a diffraction grating 34 is formed, and the connective optical waveguide 5 comprises a core 52 in which a diffraction grating 54 is formed. Then, the diffraction gratings 34 and 54 are arranged such that at least a part of one of them faces a part of the other.

In the optical interconnect structure 1 of the present exemplary embodiment, the optical wiring layer 3 comprises a plurality of diffraction gratings 34, and the optical wiring LSI 2 comprising the optical wiring layer 3 is fixed to a support substrate 9. Similarly, the connective optical waveguide 5 comprises a plurality of diffraction gratings 54, and is fixed to a connector housing 8.

The plurality of diffraction gratings 34 arranged in the optical wiring layer 3 are positioned such that at least a part of each of them faces a part of corresponding one of a plurality of diffraction gratings 54 arranged in the connective optical waveguide 5. That is, the diffraction gratings 34 in the optical wiring layer 3 are arranged at positions opposite those of the diffraction gratings 54 arranged in the connective optical waveguide 5.

The connector housing 8 has a hollow portion shown by a dashed line in FIG. 7, and one surface (the rightward surface in FIG. 7) of the hollow portion has an opening. By containing the diffraction gratings 54 within the hollow portion, the connector housing 8 holds the connective optical waveguide 5. Further, the connector housing 8 has fitting holes 81. On the other hand, the support substrate 9 holds the optical wiring LSI 2 and has fitting pins 91 which can be fitted into the connector housings 8 respectively. Positional alignment between the connector housing 8 and the support substrate 9 can be achieved by fitting the fitting holes 81 with the fitting pins 91.

A relationship between the fitting pins 91 and the fitting holes 81 can be properly selected depending on a use. It is similar to in the first exemplary embodiment that, in order to hold the connector housing 8 further, the support substrate 9 may be provided with a connector holder having a locking tool.

[Description of operation and effect] Next, operation and effect of the present exemplary embodiment will be described below. In the optical interconnect structure 1 of the present exemplary embodiment, two-dimensional arrangement of a plurality of diffraction gratings becomes possible, flexibility in the layout of connection between the optical wiring LSI 2 and the connective optical waveguide 5 is increased, and high-density connection becomes possible.

Further, the connector housing 8 and the support substrate 9 are fixed with each other by the use of the fitting holes 81 and the fitting pins 91. As a result, by attaching and detaching the connector housing 8, the connective optical waveguide 5 can be easily attached and detached, respectively, easily in an approximately perpendicular direction with respect to an optical waveguide.

In the exemplary embodiments described above, the examples have been shown for the cases where the connective optical waveguide 5 and the optical wiring layer 3 are each formed in surfaces, and they face each other, but their configuration is not limited to such one. When the connective optical waveguide 5 and a waveguide of the optical wiring layer 3 are positioned at a distance from each other, a beam diameter may be adjusted by arranging (or fabricating) a structure having a lens effect at a position on the surface of the connective optical waveguide 5 or of the optical wiring layer 3 on the optical axis of diffracted light. Further, in the connective optical waveguide 5, the optical waveguide structure needs not consist of only one layer but may consist of a plurality of layers, where a diffraction grating can be arranged in each waveguide layer.

Although the present invention has been described above according to the above-described exemplary embodiments and examples, it would not be necessary to mention that the present invention is not limited to the configurations in these exemplary embodiments and examples, and that various modifications and changes which can be made by those skilled in the art within the scope of the present invention should be included in the present invention.

Further, this application insists on priority based on Japanese Patent Application No. 2010-165919 proposed on Jul. 23, 2010 and takes everything of the disclosure here.

REFERENCE SIGNS LIST

1 optical interconnect structure
2 optical wiring LSI
3 optical wiring layer
31 cladding
32 core
33 cladding
34 diffraction grating
4 electrical circuit layer
5 connective optical waveguide
51 cladding
52 core
53 cladding
54 diffraction grating
61, 61', 63, 63' optical signal
62 diffracted light
7 spot-size converter
8 connector housing
81 fitting hole
9 support substrate
91 fitting pin

The invention claimed is:
1. An optical interconnect structure, comprising:
an optical waveguide comprising a first core; and
a connective optical waveguide comprising a second core,
  the connective optical waveguide arranged on said optical waveguide,
wherein a first diffraction grating is formed in said first core and a second diffraction grating is formed in said second core in a manner where at least a part of said first diffraction grating is arranged to face a part of said second diffraction grating,
wherein grating intervals of said first and second diffraction gratings are increased monotonously in each direction of propagation direction of optical signals which propagate inside the first and second cores, and
wherein diffracted light from one of the diffraction gratings is coupled to an other of the diffraction gratings.

2. The optical interconnect structure according to claim 1, wherein said optical waveguide comprises an electrical circuit layer and an optical wiring layer formed on said electrical circuit layer, and
wherein said optical wiring layer is configured such that a first cladding layer comprising a first cladding having a lower refractive index than said first core, a first core layer comprising said first core, and a second cladding layer comprising a second cladding having a lower refractive index than said first core are sequentially stacked.

3. The optical interconnect structure according to claim 2, wherein said connective optical waveguide is configured such that a third cladding layer comprising a third cladding having a lower refractive index than said second core, a second core layer comprising said second core, and a fourth cladding layer comprising a fourth cladding having a lower refractive index than said second core are sequentially stacked on said second cladding layer.

4. The optical interconnect structure according to claim 3, wherein the refractive index of said first core is equal to that of said second core, and the refractive indexes of said first cladding, second cladding, third cladding and fourth cladding are equal.

5. The optical interconnect structure according to claim 1, wherein the grating interval of said first diffraction grating and that of said second diffraction grating vary at a same rate in respective directions opposite to each other.

6. The optical interconnect structure according to claim 3, wherein a relative refractive index difference between said first core and said first cladding or said second cladding is higher than that between said second core and said third cladding or said fourth cladding.

7. The optical interconnect structure according to claim 4, wherein spot-size converters are provided either or both at portions before and after the first diffraction grating in said first core or at portions before and after the second diffraction grating in said second core.

8. The optical interconnect structure according to claim 3, wherein said connective optical waveguide is configured to be attached to and detached from said optical waveguide.

9. An optical interconnect structure, comprising:
a substrate provided with an optical waveguide comprising an electrical circuit layer and an optical wiring layer which is formed on said electrical circuit layer and includes a first core, and provided with a fitting unit;
a connective optical waveguide provided with a second core; and
a housing which is provided with a fitted unit to fit with said fitting unit, and fixes said connective optical waveguide onto said optical waveguide by fitting said fitting unit with said fitted unit,
wherein at least one first diffraction grating is formed in said first core and at least one second diffraction grating is formed in said second core in a manner where the diffraction gratings are arranged to face each other, and
wherein grating intervals of said first and second diffraction gratings are increased monotonously in each direction of propagation direction of optical signals which propagate inside the first and second cores.

10. The optical interconnect structure according to claim 3, wherein a relative refractive index difference between said first core and said first cladding is higher than that between said second core and said third cladding.

11. The optical interconnect structure according to claim 3, wherein a relative refractive index difference between said first core and said second cladding is higher than that between said second core and said third cladding.

12. The optical interconnect structure according to claim 3, wherein a relative refractive index difference between said first core and said first cladding is higher than that between said second core and said fourth cladding.

13. The optical interconnect structure according to claim 3, wherein a relative refractive index difference between said first core and said second cladding is higher than that between said third cladding or said fourth cladding.

14. The optical interconnect structure according to claim 4, wherein spot-size converters are provided at portions before and after the first diffraction grating in said first core.

15. The optical interconnect structure according to claim 4, wherein spot-size converters are provided at portions before and after the second diffraction grating in said second core.

16. The optical interconnect structure according to claim 9, wherein the connective optical waveguide is arranged on said optical waveguide.

17. The optical interconnect structure according to claim 9, wherein said optical wiring layer is configured such that a first cladding layer comprising a first cladding having a lower refractive index than said first core, a first core layer comprising said first core, and a second cladding layer comprising a second cladding having a lower refractive index than said first core are sequentially stacked.

18. The optical interconnect structure according to claim 17, wherein said connective optical waveguide is further configured such that a third cladding layer comprising a third cladding having a lower refractive index than said second core, a second core layer comprising said second core, and a fourth cladding layer comprising a fourth cladding having a lower refractive index than said second core are sequentially stacked on said second cladding layer.

19. The optical interconnect structure according to claim 18, wherein the refractive index of said first core is equal to that of said second core, and the refractive indexes of said first cladding, second cladding, third cladding, and fourth cladding are equal.

* * * * *